US010517437B2

(12) United States Patent
Wang et al.

(10) Patent No.: US 10,517,437 B2
(45) Date of Patent: Dec. 31, 2019

(54) APPARATUS FOR STEAMING AND BLENDING A FOOD PRODUCT

(71) Applicant: KONINKLIJKE PHILIPS N.V., Eindhoven (NL)

(72) Inventors: Bao Min Wang, Eindhoven (NL); Wei Zhang, Eindhoven (NL); En Qing Jiang, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 407 days.

(21) Appl. No.: 15/534,553

(22) PCT Filed: Dec. 3, 2015

(86) PCT No.: PCT/EP2015/078437
§ 371 (c)(1),
(2) Date: Jun. 9, 2017

(87) PCT Pub. No.: WO2016/096445
PCT Pub. Date: Jun. 23, 2016

(65) Prior Publication Data
US 2017/0325635 A1   Nov. 16, 2017

(30) Foreign Application Priority Data

Feb. 6, 2015   (EP) .................................... 15154073

(51) Int. Cl.
*A47J 43/046*   (2006.01)
*A47J 27/21*   (2006.01)
*A47J 43/07*   (2006.01)

(52) U.S. Cl.
CPC ............. *A47J 43/046* (2013.01); *A47J 27/21* (2013.01); *A47J 43/0722* (2013.01)

(58) Field of Classification Search
CPC ........ A47J 43/046; A47J 27/04; A47J 27/004; A47J 43/0716; A47J 43/0722;
(Continued)

(56) References Cited

U.S. PATENT DOCUMENTS 6,703,061 B2 * 3/2004 Kennedy ................. A47J 27/04
426/510
7,617,766 B2   11/2009 Tracy
(Continued)

FOREIGN PATENT DOCUMENTS

FR         296991 A3    7/2012
JP      2001269267 A   10/2001
WO    2007017342 A1    2/2007

*Primary Examiner* — Dana Ross
*Assistant Examiner* — Joe E Mills, Jr.

(57) ABSTRACT

The present invention relates to an apparatus (10) for steaming and blending a food product, comprising: a container (14) for receiving the food product, wherein the container (14) comprises a base (16), a side wall (18) and an annular upstanding column (20) extending from the base (16) of the container (14) and surrounding an opening (22) in the base (16); a blade assembly (30, 30') comprising (i) a first annular support member (32) which is coaxially arranged with the annular upstanding column (20) of the container (14) and (ii) at least one blade (36) which extends from the first annular support member (32), wherein the first annular support member (32) of the blade assembly (30, 30') and the annular upstanding column (20) of the container (14) together form a first steam inlet passage (58); a drive system (38) comprising a motor (40) and a drive shaft (42, 42') for coupling the motor (40) to the blade assembly (30, 30'); and a steam generator (48) for providing steam to the first steam inlet passage (58) via a second steam inlet passage (64, 64') arranged within the annular upstanding column (20), wherein the drive shaft (42, 42') comprises a hollow interior
(Continued)

which forms at least a part of the second steam inlet passage (64, 64') and is fluidly connected to the steam generator (48).

9 Claims, 3 Drawing Sheets

(58) Field of Classification Search
CPC .. A47J 36/2433; A47J 44/00; A47J 2027/043; A47J 43/06; A47J 43/0727; A23L 5/13; A23L 1/0121; B01F 7/00291; B01F 7/003; B01F 7/00458
USPC ......... 99/353, 337, 339, 348, 403, 510, 340, 99/413, 415, 331, 492, 509, 473, 474, 99/417; 366/144, 145, 146, 314; 426/518, 510, 523; 126/21 A, 369.2
See application file for complete search history.

(56) References Cited

U.S. PATENT DOCUMENTS

| | | |
|---|---|---|
| 8,960,082 B2 | 2/2015 | Bjoerk |
| 2012/0234185 A1* | 9/2012 | Bjoerk ................ A47J 43/0722 99/353 |
| 2013/0032038 A1* | 2/2013 | Lee ...................... A47J 43/046 99/348 |
| 2013/0233181 A1* | 9/2013 | Allen ...................... A47J 27/04 99/337 |
| 2014/0252146 A1 | 9/2014 | Audette |
| 2014/0272059 A1 | 9/2014 | Krebs |

* cited by examiner

APPARATUS FOR STEAMING AND BLENDING A FOOD PRODUCT

This application is the U.S. National Phase application under 35 U.S.C. § 371 of International Application No. PCT/EP2015/078437, filed on Dec. 3, 2015, which claims the benefit of International Application No. PCT/CN2014/094410, filed on Dec. 19, 2014 and International Application No. 15154073.9, filed on Feb. 6, 2015. These applications are hereby incorporated by reference herein.

FIELD OF THE INVENTION

The present invention relates to an apparatus which combines a steamer and a blender. The presented apparatus is particularly configured for steaming and blending food products in order to prepare puree, especially purees for babies and toddlers.

BACKGROUND OF THE INVENTION

One way of preparing a baby food meal is to steam a food product, e.g. fruits and/or vegetables, and subsequently blend the food product in the same apparatus. Such a combined steaming and blending apparatus is disclosed in EP 2 163 178 A1. This apparatus comprises a container for receiving the food product, wherein the container comprises at its bottom side a sieve having a plurality of apertures. The apparatus furthermore comprises a steamer for generating steam, wherein the steam is supplied to the interior of the container through the plurality of apertures within the sieve. The steam thus homogeneously cooks the food product. When steaming is complete, the container has to be removed as a whole and rotated 180°. The base of the container then faces downwardly and a drive shaft of a motor unit, which is located in the base unit of the apparatus, engages with a blade assembly. The blade assembly is driven by the drive shaft of the motor unit to chop and blend the steamed food product until the desired consistency is reached. The lid of the container may then be removed so that the steamed and blended food product may be taken out of the container. The steamed and blended food product, e.g. the baby food meal, is then ready to serve.

A disadvantage of such an apparatus is that the meal cannot be prepared from the food product in the container without user interaction, i.e. preparing the meal requires that the user needs to be present at the apparatus to change from steaming to blending. Actually, the user does not only have to operate a button to change from steaming to blending, but also has to remove the container and rotate it by 180°.

There is thus still room for improvement.

EP 2 777 450 A1 discloses a food preparation appliance for preparing food, comprising an outer bowl with a bottom and a peripheral sidewall. An inner bowl is disposed at least in part within the outer bowl in spaced relationship therewith such that a gap is defined between the inner and outer bowls. The inner bowl has an interior space in which food is contained. A steam generator is in fluid communication with the gap between the inner bowl and the outer bowl, and is operable to deliver steam into the gap between the inner bowl and the outer bowl. The inner bowl and the outer bowl are configured relative to each other to define a tortuous flow path for steam to flow from the gap between the inner and outer bowls into the interior space of the inner bowl.

SUMMARY OF THE INVENTION

It is an object of the present invention to provide an apparatus for steaming and blending a food product which enables an easier handling for the user. It is particularly an object of the present invention to provide an apparatus for steaming and blending a food product which can steam and subsequently or simultaneously blend the food product in the container of the apparatus without a user interaction.

This object is achieved according to the present invention by an apparatus for steaming and blending a food product, comprising:

a container for receiving the food product, wherein the container comprises a base, a side wall and an annular upstanding column extending from the base of the container and surrounding an opening in the base;

a blade assembly comprising (i) a first annular support member which is coaxially arranged with the annular upstanding column of the container and (ii) at least one blade which extends from the first annular support member, wherein the first annular support member of the blade assembly and the annular upstanding column of the container together form a first steam inlet passage;

a drive system comprising a motor and a drive shaft for coupling the motor to the blade assembly; and a steam generator for providing steam to the first steam inlet passage via a second steam inlet passage arranged within the annular upstanding column, wherein the drive shaft comprises a hollow interior which forms at least a part of the second steam inlet passage and is fluidly connected to the steam generator.

Preferred embodiments of the invention are defined in the dependent claims.

The blade assembly of the presented apparatus comprises a first annular support member which is coaxially arranged with the annular upstanding column of the container for maintaining the blade assembly coaxially arranged with the drive shaft and with the container. "Coaxially arranged" in this case means that both the annular upstanding column and the first annular support member share a common length axis (also denoted as middle axis).

The first annular support member of the blade assembly forms a kind of tubular or substantially cylindrical element. The at least one blade of the blade assembly may be releasably or fixably connected to said first annular support member, preferably to or near a lower end of the first annular support member. The annular upstanding column of the container is preferably arranged in a central area of the container. The annular upstanding column is preferably also designed as a tubular or substantially cylindrical element which is symmetrical with respect to a middle axis of the container. The annular upstanding column extends from the base of the container and projects upwardly into the interior of the container.

The first annular support member and the annular upstanding column of the container form a first steam inlet passage. Steam is generated in the steam generator and supplied to the base of the container via a second steam inlet passage, which is located within the annular upstanding column of the container, and subsequently to the first steam inlet passage. When exiting the first steam inlet passage, the steam is supplied into to the interior of the container at a position close to its base. The steam therefore reaches the food product within the container from below at a temperature of almost 100° C. When the steaming is complete, i.e. the food product has reached the required readiness, the blade assembly may be subsequently driven by the drive shaft in a rotatory manner allowing the container to remain in the same orientation to chop and/or blend the food products until the desired consistency is reached.

Because the steam is supplied via passages formed by the coaxially aligned upstanding annular column of the container and the first annular support member of the blade assembly to the base of the container, the upstanding annular column retains its function of a container wall, while at the same time and in the same orientation the upstanding annular column also forms one of the walls of the first steam inlet passage delivering steam to or near the base of the container. Consequently, the food product in the container can be steamed and blended without a user interaction that is needed in between steaming and blending. Generally it is also possible to steam and blend the food product simultaneously.

Another advantage is that the steam is supplied to the food product from below, so that very little energy and heat is lost compared to, for instance, an arrangement where the steam is supplied to the food product via the top of the container.

The drive shaft is according to the present invention realized as a hollow shaft.

The hollow drive shaft preferably extends into the space that is surrounded by the annular upstanding column of the container and is preferably arranged coaxially with the annular upstanding column of the container. The drive shaft is also coupled to the blade assembly and preferably also coaxially arranged to the first annular support member of the blade assembly. The drive shaft serves for both to transfer rotational movement from the motor to the blade assembly and to transfer steam from the steam generator to the interior of the container. The steam flows from the steam generator into the hollow drive shaft, which forms the second inlet passage, then enters the first steam inlet passage formed by the annular upstanding column of the container and the first annular support member of the blade assembly, and finally reaches the food product at or near the base of the container.

This provides the advantage that the steam is guided in the interior of the drive shaft and thus in a safe way without running the risk of steam exhaust and burns. Using a hollow drive shaft furthermore enables a very compact and space-saving arrangement. The arrangement is also easy to clean, because the cavity in the first annular support member can be easily accessed, e.g. using a washing-up brush.

Instead of forming only a part of the second steam inlet passage, the (hollow) drive shaft may also form the whole second steam inlet passage according to an embodiment. If the drive shaft forms the whole second steam inlet passage, the drive shaft preferably comprises at least one through-hole for fluidly connecting the second steam inlet passage to the first steam inlet passage.

According to a preferred embodiment, a diameter of the first annular support member is larger than a diameter of the annular upstanding column, wherein an inner wall of the first annular support member and an outer wall of the annular upstanding column together form the first steam inlet passage.

It shall be noted that the terms "first" and "second" shall not imply any sequential order or quantity. These terms are herein only used to differentiate between similarly or identically named elements. In fact, the steam generated by the steam generator is first supplied to the second steam inlet passage and afterwards leads into the first steam inlet passage before getting into contact with the food product in the container.

According to a further preferred embodiment, the blade assembly furthermore comprises a cover plate member which is arranged transverse to and above the annular upstanding column of the container, wherein the first annular support member is connected to the cover plate member and extends therefrom towards the base of the container.

The first annular support member thus forms the peripheral/circumferential (substantially cylindrical) walls of the blade assembly and the cover plate member forms the upper terminating end wall portion of the blade assembly. The first annular support member and the cover plate member are preferably integrally connected with each other, i.e. made of one piece. The cover plate member is preferably arranged perpendicular to the first annular support member and the annular upstanding column of the container. The annular upstanding column of the container and the first annular support member are, as already mentioned above, arranged parallel to each other and coaxially arranged to one another. This provides the advantage that, even though the steam is entering in between the first annular support member from below the container, the steam may finally reach the food product from below. In contrast to devices where the steam enters the container from above, this provides the advantage that the steam may reach the food product, which is usually located at the bottom of the container, with a higher temperature and less or no water condenses at the bottom of the container due to heat dissipation.

The steam generator is preferably arranged in a bottom section of the apparatus. From there the steam is guided upwardly in the second steam inlet passage within the interior of the annular upstanding column, then leads into the first steam inlet passage at a position close to the upper end of the blade assembly, which upper end is formed by the cover plate member, is then guided downwardly again along the first steam inlet passage in between the inner wall of the first annular support member and the outer wall of the annular upstanding column of the container, and finally reaches the interior of the container at or near the base of the container. The steam is so to say guided upwardly, downwardly and finally upwardly again in a manner of a small labyrinth.

The function of the second steam inlet passage is to supply steam to the first steam inlet passage. The second steam inlet passage is according to all embodiments arranged within the annular upstanding column. It shall be noted that "within the annular upstanding column" shall mean an area that is surrounded by the annular upstanding column, i.e. surrounded by the cylindrical/peripheral wall portions of the annular upstanding column.

According to a further embodiment, the blade assembly comprises a second annular support member coaxially positioned within the first annular support member, wherein the second annular support member and the drive shaft are coaxially aligned with each other and together form the second steam inlet passage.

The hollow interior of the drive shaft in this embodiment forms a first part of the second steam inlet passage that opens out into a second part of the second steam inlet passage which is formed by an inner wall of the second annular support member. The second annular support member is thus arranged to connect to the drive shaft in an axial direction. Both the drive shaft and the second annular support member of the blade assembly comprise a hollow channel. Together the drive shaft and the second annular support member form the second steam inlet passage in this embodiment. The second annular support member is preferably not only coaxially arranged with the drive shaft, but also coaxially arranged with the annular upstanding column of the container as well as with the first annular support member of the blade assembly. The second annular support member is configured to be arranged in the space surrounded by the annular upstanding column of the container. The second annular support member preferably runs parallel to the first annular support member of the blade assembly and is connected, preferably integrally connected to the cover plate of the blade assembly, such that it extends from above into the space surrounded by the annular upstanding column of the container. The diameter of the second annular support member is preferably smaller than the diameter of the annular upstanding column of the container. The diameter of the annular upstanding column of the container is preferably smaller than the diameter of the first annular support member of the blade assembly. The first annular support member of the blade assembly thus surrounds the annular upstanding column of the container, and the annular upstanding column of the container surrounds the second annular support member of the blade assembly. The second annular support member of the blade assembly case according to this embodiment preferably comprises at least one through-hole for fluidly connecting the second steam inlet passage to the first steam inlet passage.

A particular advantage of the latter-mentioned embodiment is that the drive shaft extends only a short distance from the motor unit into the space surrounded by the annular upstanding column of the container. The container may thus be easily detached from the remaining parts of the apparatus. The blade assembly including the two annular support members and the at least one cutting blade may be also easily detached together with the container or separately therefrom. All parts are thus easy to clean. Since the drive shaft extends only a short distance from the motor unit/base unit, the motor unit/base unit may be easily cleaned as well.

According to a further embodiment, the apparatus further comprises a control unit for controlling the motor and the steam generator, and a user interface for receiving a control command for the control unit, wherein upon receiving the control command, the control unit is configured to turn on the steam generator for a predetermined period of time and to turn on the motor after said predetermined period of time.

The user interface may, for example, comprise one or more buttons and/or a touchscreen display that allows a user (i) to turn on and off the apparatus, (ii) to regulate the speed of the motor/the at least one cutting blade, (iii) to regulate the output power of the steam generator, and/or (iv) to regulate the times for running the motor and/or the time for activating the steam generator.

It is especially preferred that the user may give a control command, e.g. by pressing a button, wherein the control unit in turn runs a pre-defined program that first turns on the steam generator for a predetermined period of time in order to steam and heat up the food product, and afterwards automatically turns on the motor in order to blend the steamed and heated food product. The user may thus prepare a steamed and blended baby meal by only one user interaction. Blending of already steamed food products is apart from that easier than blending raw food products. The control unit may be particularly configured to turn off the steam generator after said predetermined period of time, i.e. as soon as the motor is turned on. However, the steam generator may alternatively still be turned on during the time the motor is running.

According to a further preferred embodiment, the blade assembly is detachable from the container, wherein the apparatus further comprises a removable second food container which may be arranged in the container instead of the blade assembly.

This provides the advantage that the device may also be uses simply for cooking without blending. If the second food container is inserted into the container instead of the blade assembly, the steam heats up the second food container from below. According to a further preferred embodiment, the apparatus is configured to control the temperature in the interior of the container. The set temperature can meet different cook temperature requirements for different ingredients.

According to a still further embodiment of the present invention, at least one of the first steam inlet passage and the second steam inlet passage is at least partly surrounded or covered by a heat-isolating material. Heat dissipation is thus minimized as much as possible. The container may also be at least partly surrounded or covered by a heat-isolating material. Heated food products may thus be stored within the container for a comparatively long time.

BRIEF DESCRIPTION OF THE DRAWINGS

These and other aspects of the invention will be apparent from and elucidated with reference to the embodiments described hereinafter. In the following drawings

DETAILED DESCRIPTION OF THE EMBODIMENTS

Figure 1:
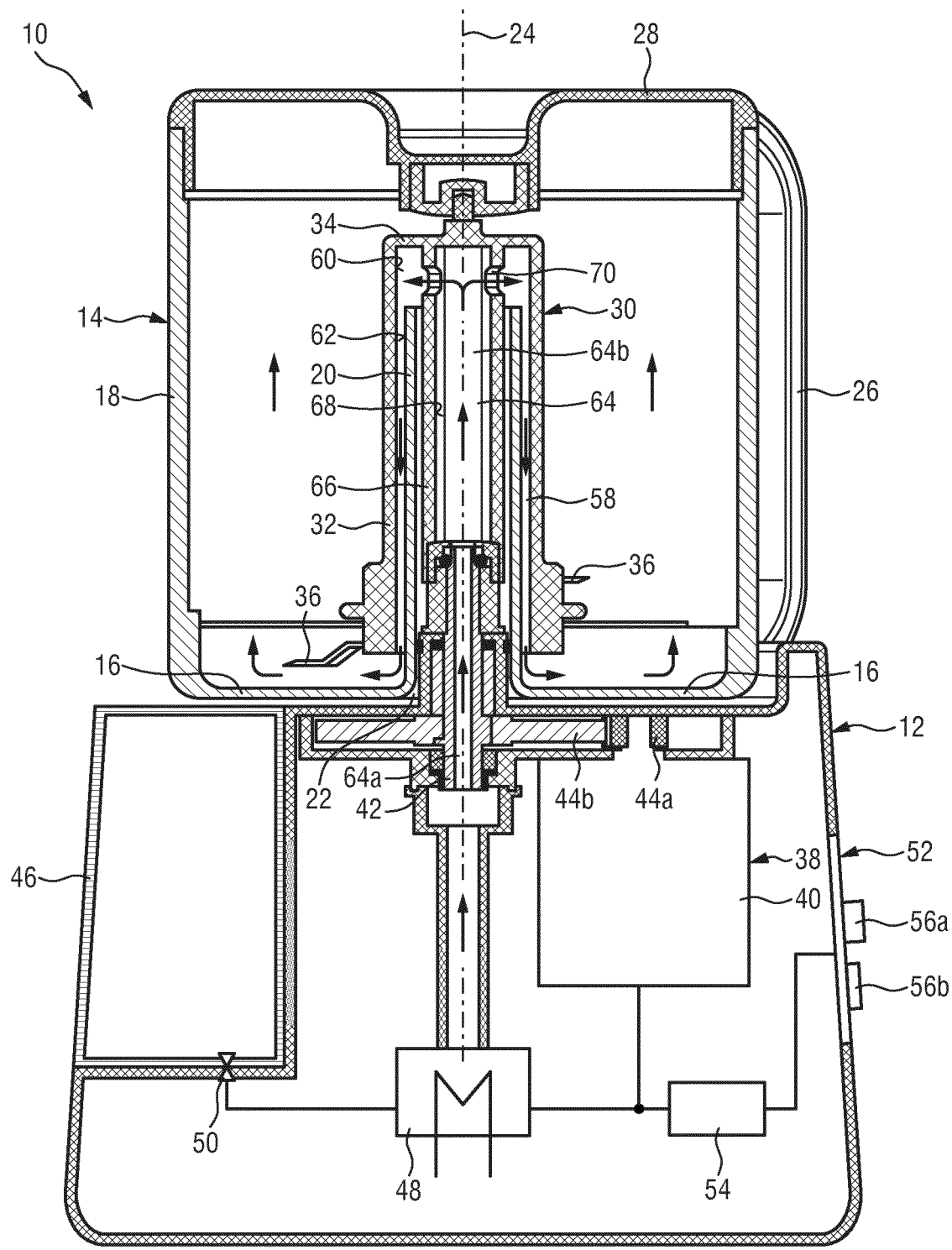
FIG. 1 shows a first embodiment of an apparatus for steaming and blending according to the present invention.

FIG. 1 shows a cross-sectional view of a first embodiment of an apparatus for steaming and blending according to the present invention. The apparatus is therein denoted in its entirety with reference numeral 10.

The combined steaming and blending apparatus 10 comprises a base body 12 and a container 14 which may be releasably attached to the base body 12. The container 14 is configured to receive a food product that may be steamed and/or blended by the apparatus 10. This container 14 comprises a base 16, a peripheral side wall 18 and an annular upstanding column 20 which extends upwardly from the base 16 of the container 14 and surrounds an opening 22 in the base 16. The annular upstanding column 20 has a substantially cylindrical shape and forms a kind of pipe or duct that extends from the base 16 upwardly into the interior of the container 14. The annular upstanding column 20 is preferably arranged in a central area of the container 14 and symmetrical to a middle/length axis 24 of the container 14. The container 14 is not necessarily symmetrical with respect to said middle axis 24. It usually comprises a handle or grip 26 arranged at an exterior of the container 14. However, despite this handle 26, the rest of the container 14 is substantially symmetrical to the middle axis 24. The container 14 furthermore comprises a lid 28 which may be releasably attached to an upper side of the side walls 18 opposite the base 16 of the container 14.

The apparatus 10 furthermore comprises a blade assembly 30 which is preferably designed to be removable from the container 14 in order to guarantee an improved cleanability. The blade assembly 30 comprises a first annular support member 32 and a cover plate 34 to which the first annular support member 32 is integrally connected. The first annular support member 32 of the blade assembly 30 has a substantially cylindrical shape and is in the mounted state of the apparatus 10 coaxially arranged to the annular upstanding column 20 of the container 14. The first annular support member 32 preferably extends from the cover plate member 34 downwards toward the base 16 of the container 14. The annular support member 32 has a larger diameter than the annular upstanding column 20, so as to surround the annular upstanding column 20. The blade assembly 30 furthermore comprises one or more cutting blades 36 which are either releasably or fixedly connected to the first annular support member 32.

The apparatus 10 furthermore comprises a drive system 38 which is configured to drive the blade assembly 30 in a rotatory movement about the middle axis 24. This drive system 38 preferably comprises an electric motor 40 which is coupled to a drive shaft 42. The drive shaft 42 is connected to the blade assembly 30. The motor 40 is according to this embodiment coupled to the drive shaft 42 via two meshing gear pinions 44a, 44b. The motor 40 and the gear pinions 44a, 44b are preferably arranged within the base body 12 of the apparatus 10. The drive shaft 42 preferably extends through the opening 22 into the space surrounded by the annular upstanding column 20 of the container 14. However, it shall be noted that instead of a coupling with gear pinions 44a, 44b other ways of coupling the motor 40 to the drive shaft 42 are possible as well.

The apparatus 10 furthermore comprises a water tank 46 which is fluidly connected to a steam generator 48 via a valve 50. Both the water tank 46 and the steam generator 48 are preferably integrated into the base body 12. The water tank 46 is preferably releasably connected to the base body 12. The apparatus 10 can realise fast steam generation. Since the water tank 46 is separated from the steam generator 48, the water may be provided to the steam generator 48 according to the demand. Therefore, the steam generator 48 does not need to boil all the water in the water tank 46, and thus saves time. The demand/release of the water can be controlled by the valve 50. Alternatively the release of water from the tank 46 may be controlled by vacuum (when the water level is lower than the inlet, the water runs into steam generator; and when the water level is higher than the inlet, the water seals inlet and the water cannot run into the generator due to vacuum). A still further alternative for controlling the release of water is the usage of a pump.

The base body 12 furthermore comprises a user interface 52 and a control unit 54. The control unit 54 is preferably configured to control the motor 40 and the steam generator 48. The user interface 52 may comprise a touchscreen and/or one ore more buttons 56a, 56b by means of which the user may turn on and off the apparatus 10 and regulate the settings of the apparatus 10, in particular the settings of the motor 40 and the steam generator 48. The user interface 52, for example, allows a user (i) setting the speed with which the motor 40 drives the blade assembly 30, (ii) setting the time the motor 40 and/or the steam generator 48 is running, and/or (iii) choosing one or more predefined operating programs in response to which the control unit 54 controls the motor 40 and the steam generator 48 in a predefined way, e.g. in a predefined sequence wherein the food product is first heated up by means of the generated steam and then blended afterwards.

One of the central points of the apparatus 10 according to the present invention is the way of guiding the steam generated by the steam generator 48 into the interior of the container 14. This special way of guiding the steam enables a compact design of the apparatus 10, a highly efficient steam transport with as less as possible heat dissipation, and the possibility to steam and blend a food product placed in the container 14 in one go without requiring complicated user interactions when changing from steaming to blending or vice versa.

The special type of steam inlet passage for guiding the steam from the steam generator 48 into the container 14 comprises a first steam inlet passage 58 which is formed by the first annular support member 32 of the blade assembly 30 and the annular upstanding column 20 of the container 14. The first steam inlet passage 58 is in other words arranged in a space between an inner wall 60 of the first annular support member 32 and an outer wall 62 of the annular upstanding column 20. This first steam inlet passage 58 opens out into the interior of the container 14 at a position close to the base 16 of the container 14, such that the steam flows through the container 14 from the bottom up. The steam inlet passage furthermore comprises a second steam inlet passage 64 which connects the steam generator 48 to the first steam inlet passage 58. This second steam inlet passage 64 is arranged within the annular upstanding column 20 of the container 14. The steam thus flows from the steam generator 48 via the second steam inlet passage 64 into the first steam inlet passage 58, and from there into the interior of the container 14.

A first part 64a of the second steam inlet passage 64 is according to the first embodiment shown in FIG. 1 arranged within the drive shaft 42. The drive shaft 42 is realized as a hollow shaft which comprises an internal channel forming the first part 64a of the second steam inlet passage 64. The second part 64b of the second steam inlet passage 64 is according to the first embodiment arranged within the blade assembly 30. The blade assembly 30 according to this embodiment comprises a second annular support member 66 which is coaxially positioned within the first annular support member 32. This second annular support member 66 is attached to the cover plate 34 and extends therefrom in a downward direction into the annular upstanding column 20 of the container 14. The second annular support member 66 is connected to an upper end of the drive shaft 42.

Similar as the first annular support member 32, the second annular support member 66 also has a substantially cylindrical shape and is preferably symmetrical with respect to the middle axis 24. The second annular support member 66 is coaxially arranged with the drive shaft 42, the annular upstanding column 20 and the first annular support member 32. The diameter of the second annular support member 66 is smaller than the diameter of the annular upstanding column 20 and smaller than the diameter of the first annular support member 32.

According to the first embodiment, the first part 64a of the second steam inlet passage 64 is thus formed by the hollow interior of the drive shaft 42. Said first part 64a of the second steam inlet passage 64 opens out into the second part 64b of the second steam inlet passage 64, wherein said second part 64b of the second steam inlet passage 64 is formed by an inner wall 68 of the second annular support member 66 of the blade assembly 30. The second annular support member 66 furthermore comprises at least one through-hole 70 via which the second steam inlet passage 66 is fluidly connected to the first steam inlet passage 58.

The function of the second annular support member 66 according to the first embodiment is twofold. On the one hand, the second annular support member 66 comprises the second part 64b of the second steam inlet passage 64. On the other hand, the second annular support member 66 serves as connector between the drive shaft 42 and the blade assembly 30 and maintains the blade assembly 30 coaxially arranged with the drive shaft 42 and with the annular upstanding column 20 of the container 14.

Figure 2:
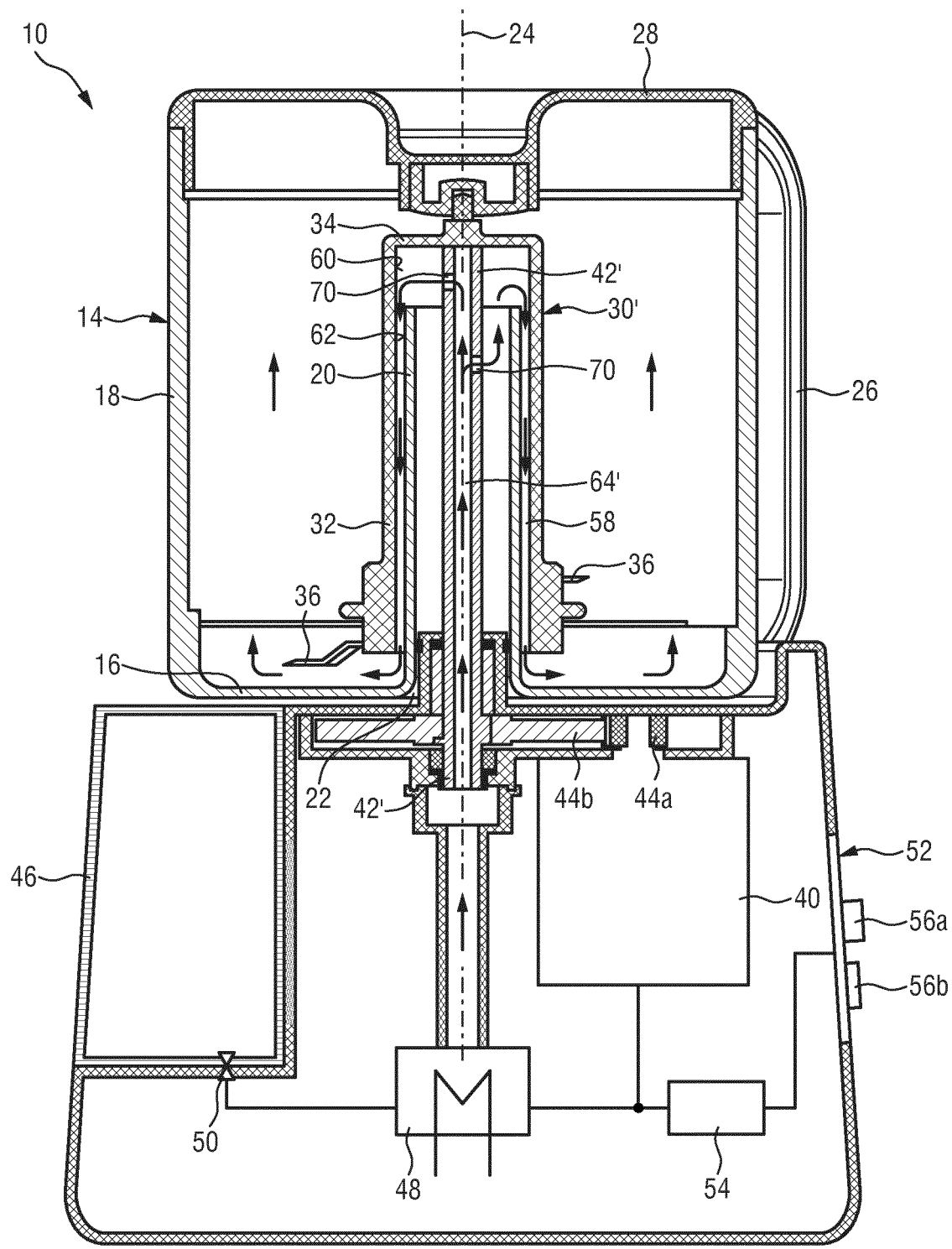
FIG. 2 shows a second embodiment of the apparatus according to the present invention.

FIG. 2 shows a second embodiment of the apparatus 10 in a cross-sectional schematic view. The principle of guiding the steam from the steam generator 48 into the interior of the container 14 via two steam inlet passages 58, 64' generally stays the same. However, the second steam inlet passage 64' is according to the second embodiment shown in FIG. 2 slightly modified. The drive shaft 42' is in this case longer compared to the drive shaft 42 shown in FIG. 1. The drive shaft 42' is also realized as a hollow shaft, but in this case comprises the whole second steam inlet passage 64'. The blade assembly 30' according to the second embodiment does not comprise a second annular support member 66 as shown in FIG. 1. The drive shaft 42' is instead directly connected to the cover plate member 34 of the blade assembly 30'. The drive shaft 42' furthermore comprises one or more through-holes 70 which fluidly connect the interior of the drive shaft 42', i.e. the second steam inlet passage 64', to the first steam inlet passage 58.

The rest of the arrangement stays the same as shown and described above with respect to the first embodiment. The first steam inlet passage 58 is still arranged between the inner wall 60 of the first annular support member 32 and the outer wall 62 of the annular upstanding column 20. The steam is still guided from the steam generator 48 via the second steam inlet passage 64' to the first steam inlet passage 58, and finally into the interior of the container 14.

Both embodiments shown in FIGS. 1 and 2 share the common inventive concept of guiding the steam from the steam generator 48 into the interior of the container 14 via a first and a second steam inlet passage 58, 64, wherein the first steam inlet passage 58 is formed by the first annular support member 32 and the annular upstanding column 20, wherein the second steam inlet passage 64 is arranged within the annular upstanding column 20, and wherein the drive shaft comprises a hollow interior which forms at least a part of the second steam inlet passage 64 and is fluidly connected to the steam generator. The two embodiments only differ with respect to the detailed configuration of the second steam inlet passage 64. Both embodiments enable the steaming and blending of a food product, wherein no extra interaction is needed by the user to change from steaming to blending. The steam guidance according to all embodiments enables an efficient heat transfer to the food product in the container 14 with as less as possible heat dissipation.

The apparatus 10 according to the present invention may also be used for cooking a food product (without blending it).

Figure 3:
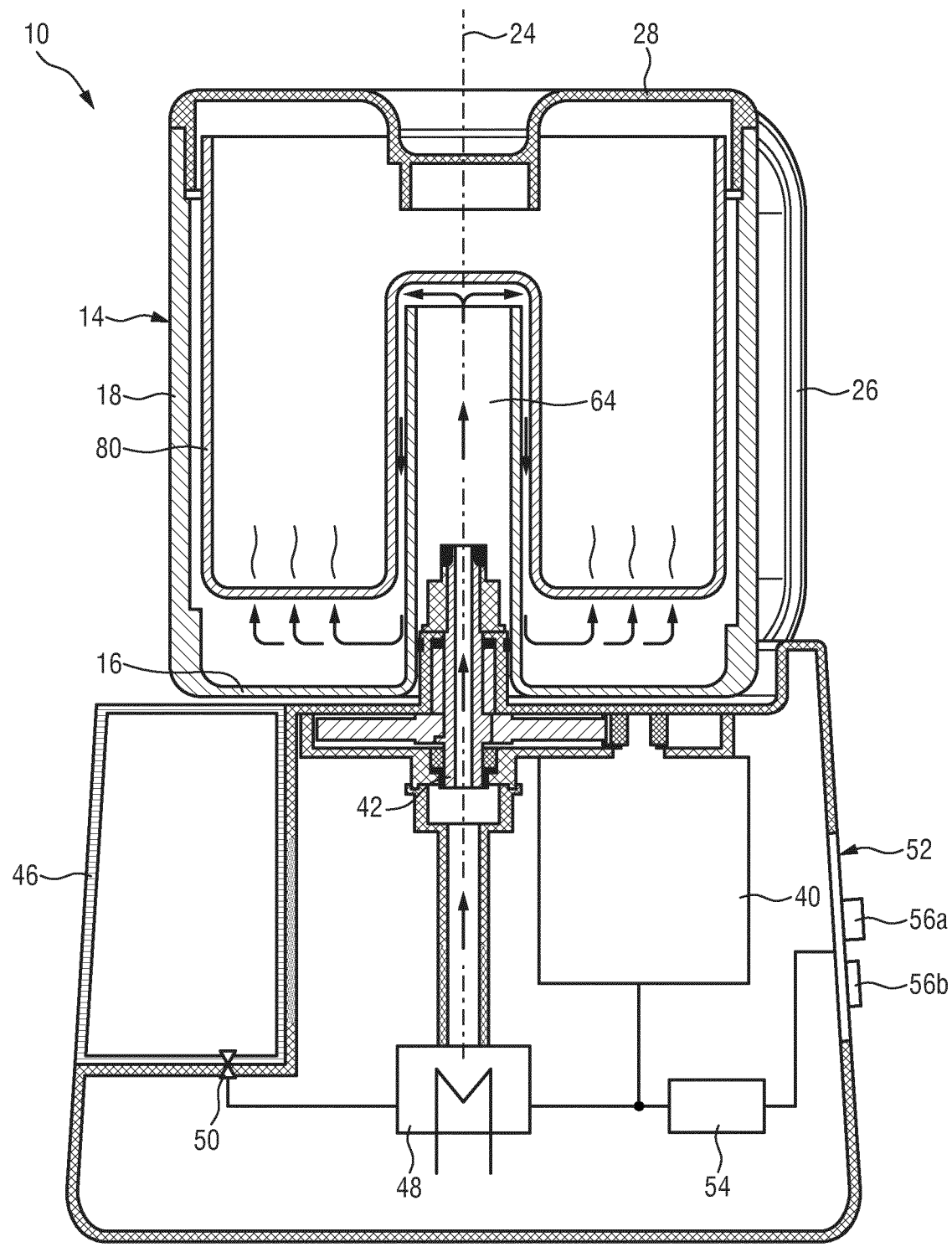
FIG. 3 shows an alternative configuration of the apparatus according to the first embodiment shown in FIG. 1.

FIG. 3 shows a configuration that is especially configured for cooking a food product. In this configuration the blade assembly 30 is detached from the container 14 and a removable second food container 80 is inserted into the container 14 instead. The second food container 18 forms a closed bowl which has a substantially W-shaped cross-section. The steam may then be guided through the second steam inlet passage 64 towards a region underneath the second food container 80. The food container 80 is thereby heated from below. FIG. 3 exemplarily shows the second food container 80 being inserted into the apparatus 10 according to the first embodiment shown in FIG. 1. However, it shall be noted that this food container 80 could also be inserted into the apparatus 10 according to the second embodiment shown in FIG. 2.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. An apparatus for steaming and blending a food product, comprising:
    a container for receiving the food product, wherein the container comprises a base, a side wall and an annular upstanding column extending from the base of the container and surrounding an opening in the base;
    a blade assembly comprising (i) a first annular support member which is coaxially arranged with the annular upstanding column of the container and (ii) at least one blade which extends from the first annular support member, wherein the first annular support member of the blade assembly and the annular upstanding column of the container together form a first steam inlet passage;
    a drive system comprising a motor and a drive shaft for coupling the motor to the blade assembly; and
    a steam generator for providing steam to the first steam inlet passage via a second steam inlet passage arranged within the annular upstanding column,
    wherein the drive shaft comprises a hollow interior which forms at least a part of the second steam inlet passage and is fluidly connected to the steam generator.

2. The apparatus as claimed in claim 1, wherein a diameter of the first annular support member is larger than a diameter of the annular upstanding column, and wherein an inner wall of the first annular support member and an outer wall of the annular upstanding column together form the first steam inlet passage.

3. The apparatus as claimed in claim 1, wherein the blade assembly further comprises a cover plate member which is arranged transverse to and above the annular upstanding column of the container, wherein the first annular support member is connected to the cover plate member and extends therefrom towards the base of the container.

4. The apparatus as claimed in claim 1, wherein the blade assembly comprises a second annular support member coaxially positioned within the first annular support member, wherein the second annular support member and the drive shaft are coaxially arranged with each other and together form the second steam inlet passage.

5. The apparatus as claimed in claim 4, wherein the hollow interior forms a first part of the second steam inlet passage that opens out into a second part of the second steam inlet passage, said second part of the second steam inlet passage being formed by an inner wall of the second annular support member.

6. The apparatus as claimed in claim 3, wherein the second annular support member is connected to the cover plate member and comprises at least one through-hole for fluidly connecting the second steam inlet passage to the first steam inlet passage.

7. The apparatus as claimed in claim 1, further comprising:
- a control unit for controlling the motor and the steam generator; and
- a user interface for receiving a control command for the control unit;
- wherein, upon receiving the control command, the control unit is configured to turn on the steam generator for a predetermined period of time and to turn on the motor after said predetermined period of time.

8. The apparatus as claimed in claim 1, wherein the blade assembly is detachable from the container, and wherein the apparatus further comprises a removable second food container which may be arranged in the container instead of the blade assembly.

9. The apparatus as claimed in claim 1, wherein at least one of the first steam inlet passage and the second steam inlet passage is at least partly surrounded or covered by a heat-isolating material.

* * * * *